US006636296B1

(12) United States Patent
Faulkner et al.

(10) Patent No.: US 6,636,296 B1
(45) Date of Patent: Oct. 21, 2003

(54) RANGE FINDER

(75) Inventors: Robert L. Faulkner, P.O. Box 63, Dorset, VT (US) 07081; Robert P. Faulkner, Fairfax, VA (US)

(73) Assignee: Robert L. Faulkner, Dorset, VT (US)

( * ) Notice: Subject to any disclaimer, the term of this patent is extended or adjusted under 35 U.S.C. 154(b) by 62 days.

(21) Appl. No.: 09/602,250

(22) Filed: Jun. 23, 2000

Related U.S. Application Data (60) Provisional application No. 60/140,747, filed on Jun. 25, 1999.

(51) Int. Cl.[7] .................................................. G01C 3/22
(52) U.S. Cl. .............................. 356/21; 33/277; D10/70
(58) Field of Search ............................ 356/8, 9, 11, 15, 356/20, 21; 33/277, 284, 297, 298; D10/46.1, 70, 71

(56) References Cited

U.S. PATENT DOCUMENTS

| | | | | |
|---|---|---|---|---|
| 2,734,273 A | * | 2/1956 | Blindenbacher et al. ...... 356/21 |
| 3,409,987 A | * | 11/1968 | New ............................ 33/277 |
| 3,688,408 A | * | 9/1972 | Smith et al. .................. 33/277 |
| 3,712,737 A | * | 1/1973 | Bitterlich et al. ............. 356/20 |
| 4,263,719 A | * | 4/1981 | Murdoch ..................... 33/277 |
| 5,094,452 A | * | 3/1992 | Hennigan .................... 473/212 |

* cited by examiner

Primary Examiner—Richard A. Rosenberger
(74) Attorney, Agent, or Firm—Richard S. Erbe (57) ABSTRACT

A low-cost-of-manufacture, portable, capable-of-adjustment range finder for estimating distances between the user and one or more objects with a known width, height or other linear dimension (such as a cup on a putting green, a target for target shooting, a military vehicle, etc.) is disclosed. In each of its embodiments, the invention relates to, and relies on, the fact that the image of an object appears to decrease in size as distance increases. In the preferred embodiment, an opening is formed through which to view the object, and recorded information is expressed on, in or included with the device so that the user can correlate the position of the object image to predetermined distance information. The shape and size of the opening are reasonably variable, but, once the size and shape are determined, the position of the distance information is fixed at the position on the opening where the image size corresponds to the indicated distance. This range finder is also capable of measuring distances from the user to a variety of objects by using the same device, to objects at short distances, to small objects and to objects at ground level.

10 Claims, 6 Drawing Sheets

RANGE FINDER

RELATED APPLICATIONS

This invention is described in our Provisional Patent Application Ser. No. 60/140,747, filed Jun. 25, 1999. This Provisional Patent Application expires Jun. 25, 2000.

FIELD OF INVENTION

This invention relates to range finders, specifically to a range finder that relies on the reduction in the size of an object's image as distance increases, as viewed through an opening in the range finder, to determine the object's distance from the user where the object's width, length, height or other visible linear dimension is known or can be estimated.

PRIOR ART

There has been a long-standing need for "range finders," ie., devices that allow the user to gauge his or her distance from an object without physically measuring the distance. Although various devices have been utilized for this purpose, two categories of range finder are relevant here: (1) "image-based" range finders that use the decrease in size of an object's image as distance increases to determine what that distance is; and (2) devices that can bounce a signal or beam off a target object, such as sonar, radar and laser range finders. The instant invention is an image-based range finder that improves upon the prior image-based art and, in addition, in some instances, complements or substitutes for signal reflection range finders.

Range Finders Based on Image Size—General

It has long been known that the perceived size of an object's image decreases with distance. This phenomenon has been the basis for simple range finding devices, which have used, for instance, a ruler to measure the size of the object's image. If the user knew both one linear dimension of the object and, via the ruler, the size of the image of that dimension, he could determine his distance from the object by using the well-established formula $d=xy/z$, where d is the object-to-eye distance, x is the known dimension of the object, y is the eye-to-device distance and z is the size of the image as measured by the ruler. Of course, if d is known, z can like wise be predicted ($z=xy/d$). As further discussed below, devices based on this concept have mainly taken three forms: reference line devices, stadia-line devices and window-based devices.

Image-Based Range Finders—Reference Line

Most common in this category of range finders are devices that employ a reference line comprising a system of measurement. Essentially a ruler drawn across the reticle of a scope, this device permits a comparison between the image size and previously determined distance information. Thus, in periscopes on submarines, distance to a surface ship has been roughly calculated based on the measurement provided by an engraved reference line on the reticle and compared to separately compiled information on the dimensions of various ships. This device provided a numeric measurement of the apparent size of the measured object which would then be compared to previously determined distance information calculated through the distance formula discussed above. Generally, this involved an additional step separate from the device itself These devices can determine distances from differently sized objects, but they pose difficulties in object alignment (i.e. having to superimpose a thin line over the image while simultaneously measuring the image size), and they require the user to access separately compiled information.

Image-Based Range Finders—Stadia-Line

Stadia-line range finders are a conceptually and practically distinct category utilizing similar distance determination principles. In these devices, a series of lines with accompanying numerals denoting distance are expressed on the reticle of a telescope or viewfinder. Each line is a different length and corresponds to the size of an image of an object of known dimension at a particular distance. The placement of lines and their lengths are also determined by the formula $z=xy/d$. Consequently, the plurality of lines, when centered on the reticle, have generally formed a curvilinear shape. In operation, the user superimposes the appropriate line over the object image in order to determine distance. This approach allows for the user to view the object image and access distance information at the same time, but it is less flexible than reference line devices because the stadia lines can only determine distance to one dimension of one item. Like reference line devices, this device partially obscures the target object.

Window-Based Range Finders

A conceptually and practically distinct category utilizing similar distance determination principles is the "window-based" range finder. Such devices enclose the object image at a particular position on an opening and correlate the image size to previously determined distance markings imprinted adjacent to the opening. The advantages of this art over reference-line devices are that the opening makes target alignment much easier, and the distance information imprinted on the device itself allows for a quicker determination of distance in that this information does not need to be separately accessed. It is superior to stadia-line art in that the object image is more easily framed and the user's view of the object is not obscured. However, as discussed below, window-based range finders have had several serious limitations, and their use has been limited.

Image-Based Range Finders—Miscellaneous

Other range finders in this general area are a range finder having a notch sized to accommodate the image of one object at one distance (Williams, U.S. Pat. No. 3,977,086); a range finder that interposes one or more two-dimensional outlines of the entire object image (e.g., a full representation of a deer) in a viewer or scope (Gregory, U.S. Pat. No. 4,787,739); a range finder that discloses a vertically expressed reference line with unevenly spaced calibration lines (Murdoch U.S. Pat. No. 4,263,719); and a range finder that causes a reference line in a viewer to vary in length, making it easier to measure image size. (Landon, U.S. Pat. No. 3,999,853).

Signal Reflection Range Finders

An additional category of distance determination art is found in devices that can bounce a signal or beam off a target object back to a receptor (e.g., radar, sonar and laser devices). These signal reflection range finders, while not directly related to the instant invention, offer an alternative prior art category of distance determination devices.

LIMITATIONS OF THE PRIOR ART

Limitations of Prior Art—Image-Based Range Finders

Image-based range finders have to date been quite limited in their effective uses.

To our knowledge, image-based range finders have thus far not been used to determine short-range distances (ie., less than 60 feet). This is not surprising because making a useful device is more complicated for short-range distance determination. Even though the standard formula d=xy/z, which is applicable to distance determination and has been used in the prior art, can generally predict the size of the image at a short distance, it is often not the sole determinant. At short ranges, additional factors which do not exist (or are practically irrelevant) at longer ranges become more important. Thus, depending on the circumstances, the device may have to account for the height of the user, changes in the distance at which the device is held, and differences in the way the eye views objects at very short range. Although such adjustments are not always necessary, they would likely have presented significant difficulties. A device that has the flexibility to adjust for such factors where necessary and to provide for distance determination at relatively short distances would be a substantial improvement over the prior art, which is tied to the standard formula.

In addition, we understand that image-based range finders have thus far not been used to estimate distances to relatively small objects (i.e., objects with a linear dimension of less than 1.5 feet), such as a golf hole on the golf green. Useful applications for such a device would have been thought limited given that (1) absent a magnifying element, only short ranges can be determined, and (2) the less distance involved, the more likely the need for precision. (A margin of error of 25 yards might well be acceptable in a range finder for use in a periscope range finder but not, for example, in a device for the putting green). Moreover, because the object is small, distance measurements quickly become "long-range" in that the object appears very small and the rate of decline in image size slows such that a relatively small change in image size (z) could indicate a substantial change in distance (d). In these conditions, the prior art, thought applicable in theory, may well have been an impractical option because (1) a user of a reference-line device would have great difficulty pin-pointing image size with sufficient, precision to yield a reasonably precise result; and (2) the maker of a stadia-line or window-based device, as discussed more fully, below, would need to form either a very long opening to accommodate the window or lines or make the distance-indicating lines very close together. Thus assuming anyone had thought to apply the prior art to short-range applications, it would not have been obvious that a practically useful device could be made.

Further, image-based range finders have not been used to determine distances from the user or an object on the ground at the user's feet, such as a golf ball, to another nearby object on the ground, such as a golf hole. There may be many reasons for this, including those set forth herein, but one is specific to this situation. The application of the z=xy/d formula alone will not render an accurate result in this context. In order to create a device for determining the distance from an object adjacent to the user's feet to another object on the ground, as determined though the user's eyes, or the distance from the user's feet to a distant object on the ground, the device must be adjusted in accordance with the formula $a^2=b^2+c^2$, where a is the distance from the eye to the desired object on the ground, b is the distance from the user's eye to the object at the user's feet (or the ground) and c is the distance from the desired object to the object at the user's feet (or the user's feet). While use of the formula $a^2=b^2+c^2$ may be necessary in various applications of the formula z=xy/d, it is particularly important in situations such as this where there is a significant variation in the levels of the eye and the desired object that by definition cannot be assumed away. Thus, any device based solely on the z=xy/d formula could be significantly inaccurate in these circumstances.

In addition, the application of the standard formula (z=xy/d) to the prior art has generally required that there be an assumed or constant eye-to-device distance. The prior art has assumed a certain eye-to-device distance or required a string or other non-flexible appendage to hold the device at a constant eye-to-device distance. In many applications, such assumptions or appendages are appropriate methods to implement the traditional formula. However, their flexibility has been limited. It has been difficult to adjust where necessary or useful to varied arm lengths or other potential variations in the user's device positioning. A device that can, where appropriate or useful, adapt to such variations would be an improvement.

While the window-based range finder is perhaps the most user-friendly of the image-based range finders, it has, until now, suffered from additional significant limitations. Typically, the shape of the windows in these devices has been required to be curvilinear. In many instances, the distance markings have been required to be uniformly spaced. The requirement to apply such a curvilinear shape with uniform distance markings substantially limits a manufacturer's ability to make a commercially successful device. In essence, the established distance formula (z=xy/d) as applied in such devices determined both the shape of the device and the means to measure the distance. In addition to a general lack of flexibility in device design, such requirements would limit the range of distances a device could determine. For example, a window intended to estimate long-range distances (i.e., distances at which the target object appears to be very small) must necessarily be quite long because the slope of the curvilinear line begins to flatten as the rate of decline in image size slows. This problem would be even more pronounced when one sought to make a device for determining a large range of distances (e.g., long-range, mid-range and short-range). Once again, such a window would be much too long for practical use and/or would have markings that are much too close together to easily read. These shape and markings requirements would also limit the device to distance determination for one dimension of one item. In this regard, the shape of the window is specific to the size of the item to be measured, ie., other items of different sizes could not be accommodated on the same device. Similarly, the fact that the window must be a certain size and shape limits the options of the manufacturer to, for example, incorporate the range finder into another device. A window-based range finder that does not require a curvilinear shape and that does not depend on equally spaced lines would unlock a previously unexplored potential of such devices.

The limitations of the window-based range finder prior art can be seen in two representative devices, both relating specifically to determining mid-range distances from the flag stick or "pin" on a golf course (New: U.S. Pat. No. 3,409,987; Liao: U.S. Pat. No. 5,211,395).

The New patent discloses an invention solely for determining the mid-range distance (from 80 yards to 200 yards) from a golf pin of a standard height of 7.5 feet. The device consists of a card member with an opening having (1) a bottom horizontal line with uniform linear graduations imprinted on the opaque surface adjacent to the opening; and (2) a top line that is curvilinear. The shape of the opening is absolutely determined by the z=xy/d formula. The graduated lines are evenly spaced along the bottom line. In practice, the user would hold the device at a length of 20 to 25 inches from the eye, align the flagstick in the opening, and read the corresponding distance based upon the markings on the bottom line. If the pin is not 7.5 feet in height, the device can be adjusted as follows: the user must stand 20 yards from the pin, turn the device on its side, line up the image of the pin by moving the device closer or farther away from the eye until it fits the opening, and thereafter hold the device at exactly that distance from the eye through memory, a string attached to the device, or marks on a golf club.

The Liao patent discloses a highly similar device incorporated into a putting green repair tool. Here, a curvilinear V-shape created by the two prongs of the putting green repair tool forms an opening similar to that disclosed in the New patent. Uniformly spaced lines along the prongs indicate the proper distance (60 to 200 yards) and golf club to be selected. The shape of the opening is determined by application of the z=xy/d formula. The opening is formed through the convergence of the two curvilinear edges of the prongs of the tool. An inelastic string is used to ensure a consistent eye-to-device distance. The Liao device does not appear to be adjustable.

The New and Liao patents by their terms are limited to a specific measurement of the mid-range distance (60 to 200 yards) to the pin. Neither makes any claim or discloses any object or application relating to determining the distance from any other object (including on the golf course); determining short-range or long-range distances; determining distances between objects on the ground; using a non-curvilinear opening of any other shape; using a series of openings, using distance markings that are not evenly spaced; adjusting the range finder (except as described above) to accommodate differently-sized objects or different distances between the eye and the device; or incorporating the invention into an adjustable electronic range finder. As discussed above, this is likely to be due to the inherent limitations of the prior art.

Almost all range finders other than reference line devices (which have their own limitations), have been designed to determine distances to only one object of a particular dimension, such as a golf flag stick. For example, the length of each line in a stadia-line device, and the shape of the window in a window-based device, are determined by the formula as described above (z=xy/d) and have not been altered to accommodate multiple objects of different sizes. For an example of how difficult it has been to create even minimal adjustability in such devices see New U.S. Pat. No. 3,409,987. Gregory U.S. Pat. No. 4,787,739 discloses an electronic device that allows the user to electronically change the predetermined outline of an object expressed on a liquid crystal display reticle in a scope such that, by pressing a button, a differently sized outline of a deer or other object will appear in the reticle. It is unclear whether this is a significant improvement over the prior art since the user must select one outlined image, determine if it fits the object image, pick again if not, and repeat the process until the outline image corresponds with the object image. In most instances, a device that requires a trial-and-error process, electronically enhanced or not, is not adaptable to the usual desire of the user for a quick determination of distance. A window-based device that could determine distance to more than one object would be quite useful.

Limitations of Prior Art—Signal Reflection Devices

The advent of devices that can bounce a signal or beam off a target object (e.g., radar, sonar and lasers) marked a substantial improvement. Today, signal reflection range finders are exceedingly fast, accurate and applicable to many distance determination problems. However, such devices have several limitations, including cost of manufacture, size and weight. Signal reflection range finders are also limited by the conditions under which they can be used, often warning that their effectiveness is limited in bright, foggy, misty, rainy or snowy conditions, or that their effective range varies with the color, shape or reflectivity of the target object. In addition, the use of high tech components increases the risk of component damage or failure. In many cases, such devices also require ongoing efforts to maintain the power source. A device which could solve many of the same distance determination problems addressed by signal reflection range finders without many of their limitations would also be a significant improvement.

Limitation of Prior Art—Summary

The various image-based range finders have historically been quite limited in their effective uses for many reasons, including (1) the need to rely on lines or openings that interfere with the user's view of the object and/or that must be a particular size or shape, (2) the difficulty in making a device that is adjustable to differently sized objects or different eye-to-device distances, (3) the difficulty in using the devices to determine relatively long distances, (4) the difficulty in determining distance to relatively small objects, and (5) the difficulty in using such devices to determine relatively short distances or to determine distances between objects on the ground.

Today numerous distance determination problems remain unsolved—and would not be feasibly or easily solved by the prior art. For example, in the six centuries since the invention of golf, no device, laser-based or otherwise, has been developed that allows the user to determine distance on and around the putting green to the golf hole, knowledge of which is an important element of the putting game. No simple, relatively low-cost-of-manufacture device has been developed to allow a target shooter or other person to determine distance to the target without physically measuring the distance. No simple, relatively low-cost device allows a sports coach, gym teacher or other person, in setting up the boundaries and other parameters of athletic games, to determine distance to buoys, bases, goals, chalk marks or the like with reasonable accuracy. A soldier in the field has no lightweight, relatively low-cost distance determining option to replace, complement, test or "back up" a signal reflection range finder. No device exists for these or other purposes allowing for simple, adjustable range finding without the use of a bounce-back signal or beam. And no electronic window-based device provides a fully adjustable range finder capable of determining distance from a wide variety of objects of different sizes through one opening. As set forth below, our invention solves a far broader range of distance determination problems, such as the above examples, —and/or solves them at a much lower cost and reduced complexity—than any prior art.

BRIEF SUMMARY AND OBJECTS OF INVENTION

The instant invention is an image-based range finder. In each of its embodiments, the invention relates to, and relies on, the fact that the image of an object appears to decrease in size as distance from the object increases. The invention expands dramatically the types of image-based range finders that may be constructed by eliminating the need to depend on curvilinear shapes on equally spaced lines and markings. The invention further incorporates a new use of image-based range finders by determining relatively short ranges to relatively small objects, and determining distances from an object on the ground to another object on the ground at the user's feet or to the user.

In its window-based embodiments, the invention can take the shape of a card, viewer, scope or any other structure (which may include a focusing, magnifying, or image-reducing element) containing or including an opening, aperture, prongs, window or series of windows allowing the user to view a distant object through the opening in such a way that the image of the object appears to touch, without being obscured by, at least two sides of the opening at a specific position on the opening for each particular distance from the object. Marks, lines, numerals, tables, stored data and/or other expressions of predetermined distance information are indicated on or incorporated into the invention such that the user can relate the size of the object image to previously determined distances. The shape of the opening is variable, i.e., its shape does not depend, except in the most general way, on the z=xy/d formula described above. However, this formula is taken into account in the determination and expression of the distance information on or in the invention.

When the invention is to be used to estimate relatively close distances from an object on the ground at the user's feet, such a golf ball, or the user himself, and another object on the ground, such as the golf hole, an additional adjustment to the opening or distance information is needed to account for the height of the user, or a chosen average height. The z=xy/d formula as described above is adjusted in accordance with the additional formula $a^2=b^2+c^2$ (where a is the distance from the eye to the desired object, b is the height of the eye, and c is the distance from the object at the user's feet or the user's feet to the desired object) to provide for the correct eye to desired object distance. While this formula could be theoretically considered in all distance determination instances, its practical relevance increases in circumstances such as these. Through use of this additional formula, the distance information and distance markings can be accurately determined. In some cases, the device can be implemented with averaged data. In such circumstances, the more accurate information provided based upon the application of the additional formula above would allow for more accurate average information for inclusion in the device as well. In some circumstances, additional trial and error observations may prove useful to take into account other variables such as the method of holding the device or vision adjustments at very close distances.

In this specification, various window-based embodiments are disclosed. In practice, the user holds the device at a specified approximate distance from the eye (which may include holding the device against the eye), aligns the image of an object of known or estimated width, height or other linear dimension so that the image appears to just "touch" two sides of the opening, and the user then determines the approximate distance to the object by relating the position of the image within the opening to recorded distance information, such as lines, marks, numerals, tables or other stored information. While the various embodiments focus on the window-based range finder, it should be understood that lines drawn across a transparent viewing portion which are drawn to define the included area of a window would be included in the disclosed embodiments as well. For instance, this would include instances in which stadia-lines are drawn to illustrate the distance between the long sides of an isosceles triangle shaped range finder window at various points.

By creating the conditions for variable shapes and distance markings, the invention also makes it easier to make one window-based range finder that can determine distances from a broad variety of differently sized objects, where at least one known or estimated linear dimension of each desired object is available. Thus, in some embodiments a system of measurement is expressed on or adjacent to the edge of the opening such that the user can determine the exact position on the opening where an object's image appears to touch, without being obscured by, at least two sides of the opening. Recorded in, on or separately from the range finder is information correlating all relevant distances, object dimensions, and positions on the opening. In operation, and by way of example, the user (1) aligns the target object (e.g., a 10' long truck) in the opening; (2) notes, using the system of measurement, the exact position on the opening where the relevant dimension appears to just touch two sides of the opening (e.g., 2" from the vertex of a triangular opening); and (3) accesses the relevant distance information calculated through use of the z=xy/d formula, adjusted as necessary by the formula $a^2=b^2+C^2$. In this example, the device would show that a 10' long truck is a particular distance away from the user when its image is cabined by two sides of the opening at a by position that is two inches from the opening's vertex. Note that, unlike a reference line device, it is not the image that is being measured, but the image's position on the opening. We do not believe that any prior art is based on correlating image position in an opening to recorded distance information. Note also that, while the opening could be formed through the convergence of curvilinear lines, there is no particular reason to do this, since the narrowing of the opening is not determined by plotting points in conformity with a formula.

Accordingly, it is an object of the present invention to provide a range finder that:

(1) is relatively simple, light-weight, portable, low-cost, and rugged, particularly as compared to signal reflection range finders;

(2) can be made to provide a means by which a person can determine distance to a visible object if the height, width or other linear dimension is known;

(3) determines distance by viewing an object through a portion, an opening, aperture, prongs, opening or series of openings that does not have to be a particular shape;

(4) relates the size of an object's image at a particular distance to lines, marks and/or numerals that need not be evenly spaced;

(5) can be made to determine the distance to any object visible to the eye with or without the aid of a magnifying, focusing, image-reducing or other vision-enhancing element;

(6) can be made to determine relatively short and long distances;

(7) can be made to be adjustable to different object sizes and different eye-to-device distances, where appropriate, without changing the shape of the opening;

(8) can form a far more adjustable window-based range finder by linking individual range finders which can accommodate different object dimensions or different distance ranges;

(9) can accommodate a wider range of distances than a typical window-based or stadia-line range finder;

(10) can be made to allow the user to determine the distance from a point on the ground (such as a golf ball) to another point on the ground (such as a golf hole);

(11) can be made to allow a target shooter, archer or other person to more easily position him or herself from a target;

(12) can be made to provide a hunter, soldier or any other person with a distance determination problem with a range finder that can replace, complement, back up or test existing signal reflection range finders;

(13) uses less energy than laser-based range finders, i.e., requires no separate power source or a much smaller power source;

(14) can be used in any lighting or atmospheric conditions that allow the user to see the object; and (15) can be used regardless of the color or shape of the object.

Further objects and advantages of the invention will become apparent from a consideration of the drawings and ensuing description.

Figure 1:
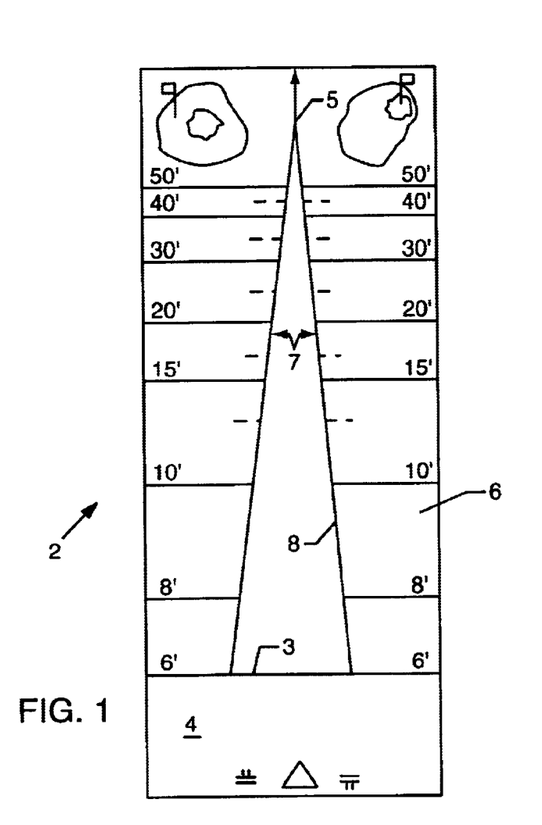
FIG. 1 is a front elevation of a range finder embodying an embodiment of the present invention.
Figure 2:
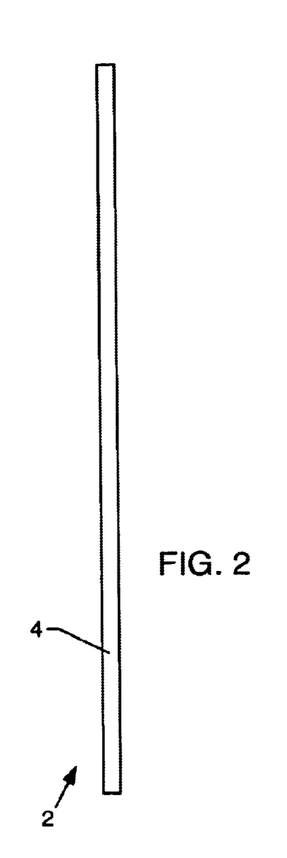
FIG. 2 is a side view of the range finder of FIG. 1.

DETAILED DESCRIPTION OF THE INVENTION (FIGS. 1,2 and 3): The range finder 2 in accordance with a first embodiment of the invention is illustrated in FIGS. 1 and 2. As shown therein the range finder 2 comprises a relatively thin card-like member 4 which may be made of any suitable material such as paper, cardboard or plastic. For example, a preferred form of this embodiment may be made of opaque or translucent rigid or semi-rigid plastic. As illustrated, the member 4 is made of an opaque material i.e. a first portion 6 is opaque and defines a generally triangular-shaped window 8 or opening through which a person can view an object. In one embodiment of the invention, the window is sized so that the linear width of a 4¼" diameter golf hole is accommodated by or just touches the sides of a triangle at a distance of from about 5 feet to about 65 feet when viewed through the window 8 held at arms' length. The dimensions of the invention and opening(s) can vary depending upon their application. From a practical standpoint for this example using a hand-held device extended at arm's length, the base 3 of the window 8 would generally be between about ¾ of an inch and 1¼ inch-and the height of the isosceles triangle would generally be between about 5 inches and 6 inches. In one preferred form of this embodiment the included angle 7 is between about 5 degrees and 20 degrees (preferably between about 8 degrees and 15 degrees) with a most preferred angle of about 12 degrees. In this form the range finder 2 has a thickness of between about ¹⁄₃₂" and ¼". The thickness of the range finder may vary substantially depending on the material used in its construction and its form. For example, the range finder 2 may be made of paper, plastic or other suitable material.

Expressed adjacent to window 8 are unevenly spaced calibration lines and numerals indicating position on window 8. Window 8 calibration lines and numerals are exemplary and may not correspond to features of an actual device.

Figure 3:
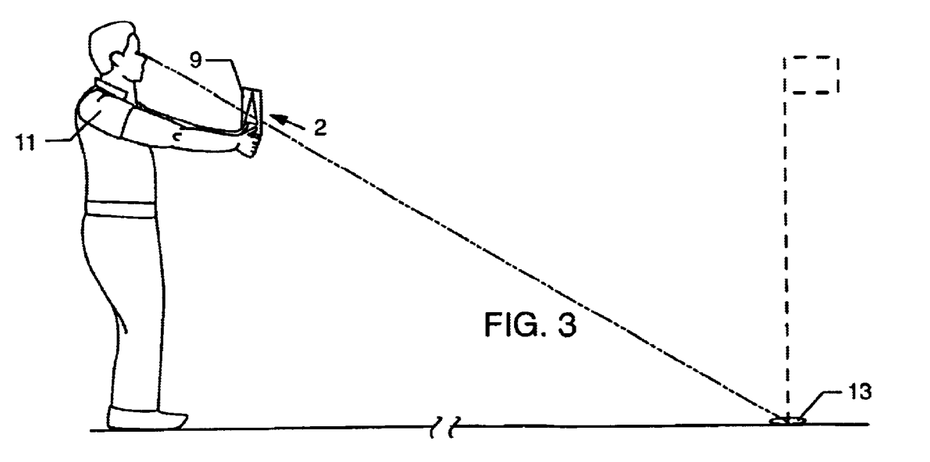
FIG. 3 is a diagrammatic representation showing a golfer using the range finder of FIG. 1.

FIG. 3 shows a person 11 using the range finder 2. As illustrated, the person 11 stands over a golf ball (not shown) and holds the range finder 2 in one or both hands at arm's length in a generally vertical position (i.e., with the base 3 of the triangular window 8 in a horizontal plane and its apex 5 pointing upward). The person views a golf hole 13 through window 8 and moves the range finder 2 until the horizontal linear dimension of the image of golf hole 13 appears to touch, without being obscured by, the two long sides of the isosceles triangle shaped opening formed by window 8. It is not necessary for the two long sides of the opening to meet at the top to form a closed triangle in order for the invention to be complete. The person 11 looks at the calibration line and numeral adjacent to (or most nearly adjacent to) that position and reads the distance to golf hole 13. It is understood that range finder 2 could be made to determine distance from the vertical linear dimension of golf hole 13, in which case person 11 would hold the device such that base 3 is vertical and apex 5 points either to the left or right. It is contemplated that range finder 2 could be made so that different methods for holding the device and/or different eye-to-device distances could be used (e.g., monocular or binocular devices with the shape and information implemented on a reticule in such visual device). It is also contemplated that averaged data could be used in certain implementations. It is further contemplated that in some embodiments, the window portion may be encased by lines which identify the window shape rather than by an opaque area. Further, it is contemplated that the device could be used in conjunction with other vision enhancing elements such as magnification, focus capability and image reduction features.

Preferred Embodiment (Operation)

The range finder of the preferred embodiment has an opening which is in the general shape of an isosceles triangle. The device is held at the user's eye, at arm's length or at another approximate defined distance from the eye, and the object is then viewed through the range finder. The range finder is then moved until the image of the object, as seen through the range finder, appears to touch, while not being obscured by, the two legs of the opening, and the distance can then be judged based on the nearest line and numeral denoting distance. The preferred embodiment can determine the distance from an object of a particular width if the vertex points up or down, and of a particular height if the vertex points left or right. If another linear dimension is known (e.g., the length of a diagonal line appearing on the object), the user can adjust the device by rotating the device until the object image first appropriately within the opening. While this invention has application to determine the distance to an infinite number of objects which could be covered under this invention, the preferred embodiment is a range finder for use on a golf course to measure the distance from a golf ball or golfer to a putting cup or a greens flag.

Additional & Alternative Embodiments—Card Members with Triangle Shapes

A second embodiment is a card member in accordance with the preferred embodiment but having an opening in the shape of a triangle other than in the general shape of an isosceles triangle.

Figures 4, 5:
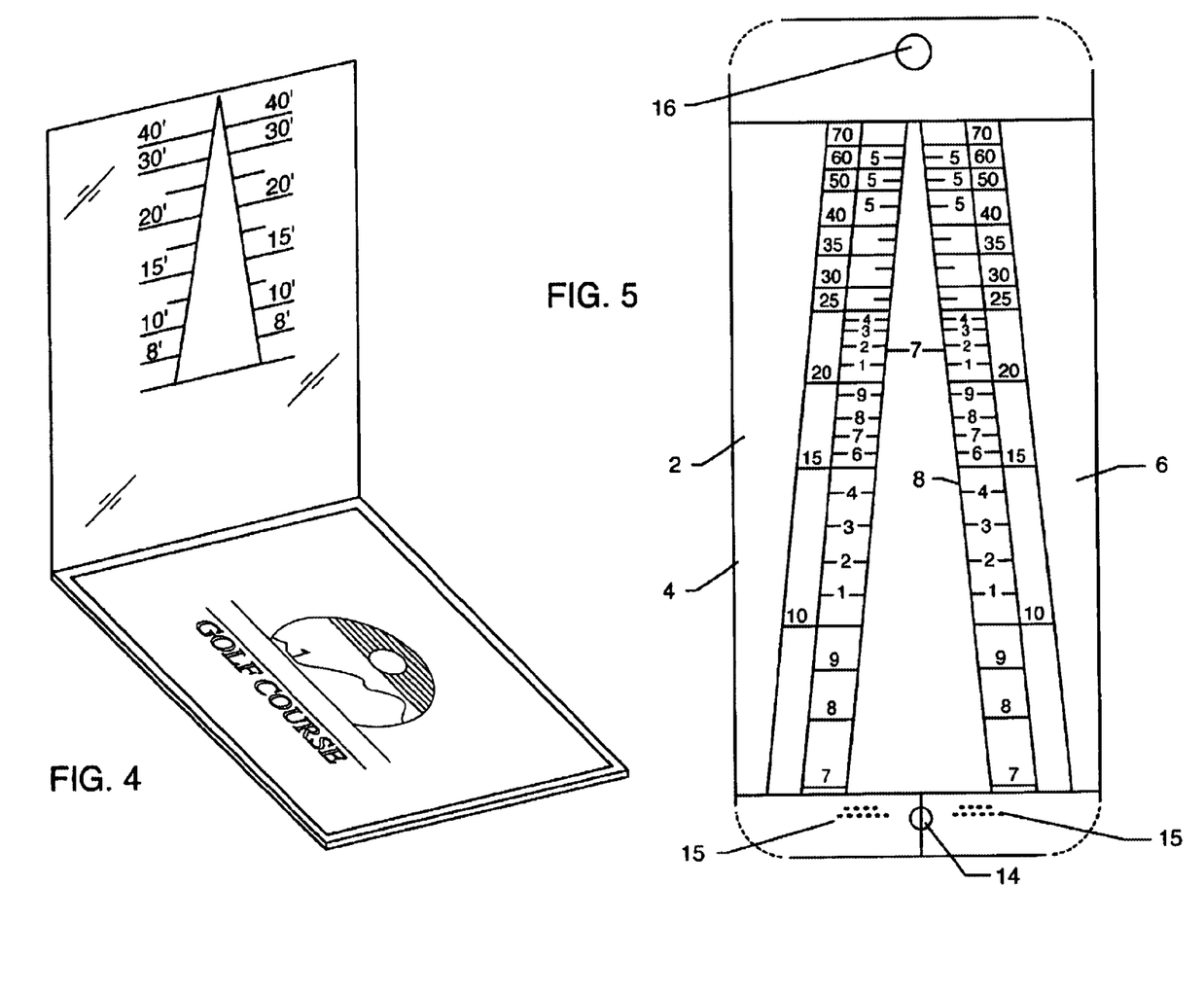
FIG. 4 is an isometric view of an alternative form of the range finder of FIG. 1.
FIG. 5 is a front elevation of an additional alternative form of the range finder of FIG. 1.

(FIG. 4): A third embodiment, shown in FIG. 4, is a card member and triangle-shaped opening in accordance with the preferred embodiment that forms the cover of a golfer's scorecard. The cover is made of a clear plastic sheet and adapted to slip over a scorecard. By opening the cover, a golfer views the cup through the triangular opening. The range finder is then used as described above.

A fourth embodiment is a card member in accordance with the preferred embodiment having a triangular opening and, in addition, an arm positioned on one long side of the triangle and affixed in or to the card member. The arm is made to slide across the opening from one side and thereby narrow its dimensions. This allows the device to adjust, where appropriate, for use by persons of different heights and/or arm lengths while using the same markings.

Figure 6:
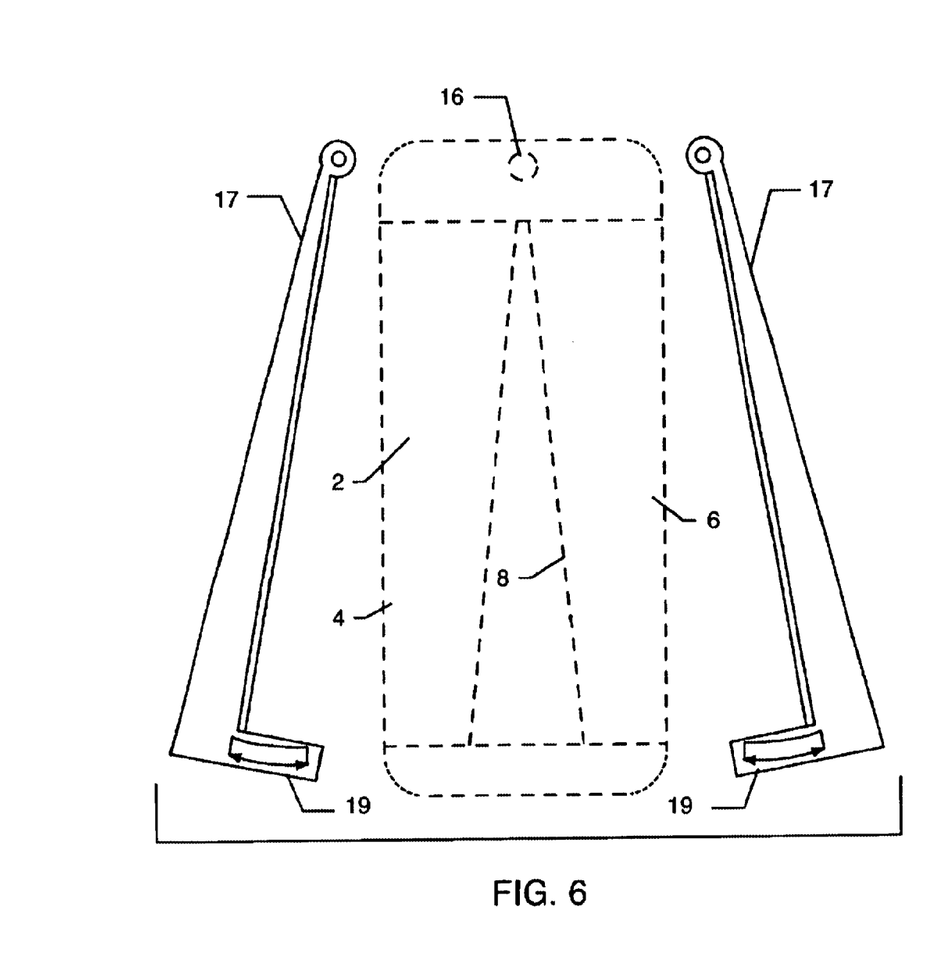
FIG. 6 is a back elevation of the additional alternative form of the range finder of FIG. 5.

(FIGS. 5 and 6): A fifth embodiment, as shown in FIGS. 5 and 6, is a range finder 2 in accordance with the preferred embodiment having a card-like member 4, where a first portion 6 is opaque and defines a generally triangular-shaped window 8 or opening through which a person can view an object. In addition, two movable arms 17, each positioned along each leg of the triangular-shaped opening and affixed to the top portion of the card member 4 by some fastening unit at a specified pivot point 16 on the back of the card-like member 4 or within a thicker embodiment of the range finder 2. The arms 17 are made to move from the central pivot point 16 to open or close the legs of the triangular-shaped opening in a fashion similar to a scissor motion. Markings 15 at the base of the triangular opening allow the user to identify the adjustment appropriate to the user and/or to secure the opening as adjusted through a second fastening unit 14 to secure the arms 17 along the extended tabs 19. This embodiment allows the range finder 2 to be adjusted, where appropriate, for use by persons of different heights and/or arm lengths while using the same markings and general opening shape.

Additional & Alternative Embodiments—V-Shaped Openings

Figure 7:
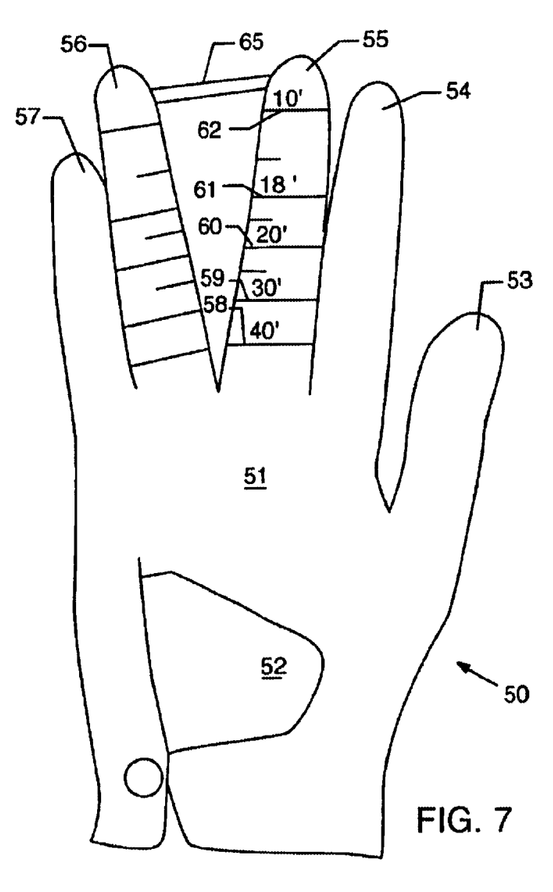
FIG. 7 is a back elevation of a glove embodying an alternative form of the range finder of FIG. 1.

A sixth embodiment is a first member having a v-shaped opening with a vertex having an included angle of between 5 degrees and 20 degrees but preferably 12 degrees. Lines and numerals are expressed on or adjacent to the edges or prongs of the opening. While this structure could be incorporated into innumerable devices, the following additional, exemplary embodiments are described as embodiments seven through ten:

(FIG. 7): A seventh embodiment of the invention is shown in FIG. 7 wherein a conventional golf glove has been modified to incorporate a range finder in accordance with this invention. As illustrated a golf glove 50 includes a back portion 51 which covers the back of a golfer's hand. The glove 50 also includes a tab portion 52 with a Velcro fastener or the like on one side thereof for snugly fastening the glove about the hand of a golfer in a customary manner. A palm portion (not shown) and back portion 51 are connected by seams and sections which correspond to the parts of the human hand such as the thumb portion 53 and finger portions 54, 55, 56 and 57. The calibration lines can be preprinted on either side of the glove. However it is preferred to have the printing on the back of the glove to avoid removal of the lines due to wear.

As shown in FIG. 7, the portion of the glove which covers the back of the fingers 55 and 56 includes a plurality of calibration lines 58–62 printed thereon as well as the distances to the golf hole when the golf hole just fills the space between the two fingers. The glove 50 also includes means such as a strap 65 or stitching for limiting the spread of the fingers to provide a triangular window wherein the golf hole when viewed through the fingers is at the distance as indicated by the calibration lines. While FIG. 7 illustrates the range finder between the two middle fingers the range finder could be alternatively applied to a golf glove between other fingers such as between the index finger 54 and the adjacent finger 55.

Figure 8:
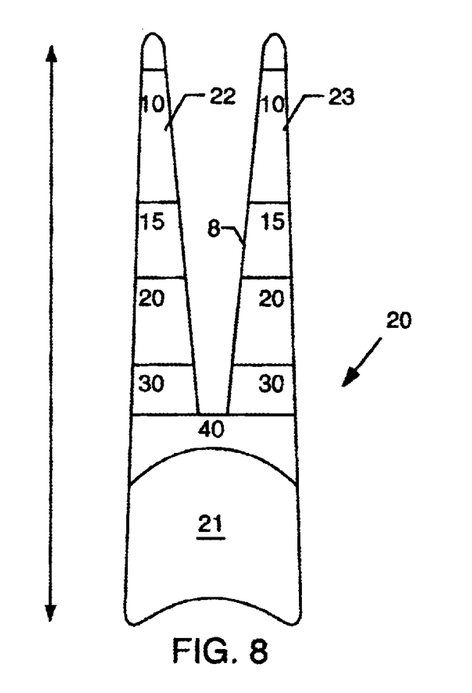
FIG. 8 is a front elevation of a tool embodying an alternative form of the range finder of FIG. 1.

An eighth embodiment, seen in FIG. 8, is a set of prongs, in accordance with the invention, incorporated in a greens repair tool.

(FIG. 8): FIG. 8 shows yet another embodiment of the invention wherein a range finder is incorporated in a greens repair tool 20. As with conventional greens repair tools, the two prongs 22 and 23 incorporating the invention are forced into the ground adjacent to an indentation made by the ball and the ground gently forced upward. Working from several sides of the indentation and smoothing with the thumb or foot the green is repaired to it normally smooth contour. Then, when a golfer wishes to estimate the distance between a golf ball and a golf hole or a greens flag, he inverts the tool and views the golf hole through the window in the same manner as described in connection with the first embodiment of the invention. In this embodiment the range finder is made of a rigid material such as a metal or rigid plastic as used in conventional greens repair tools. As shown in FIG. 8, the green repair tool 20 includes a base 21 and a pair of prongs 22 and 23. The two prongs 22 and 23 form a v-shaped opening or window 8. The linear dimension of the desired object, in essence, completes the triangular shaped opening by providing the base at one place. The user would note this point and refer to the numerals and lines on the two prongs 22 and 23. Numerals and lines placed on the two prongs 22 and 23 indicate the distance of the user from the desired object, such as a golf hole and/or a greens flag.

A ninth embodiment is a set of prongs in accordance with the invention included in a conventional multi-blade tool, including, but not limited to, multi-purpose tools which include knives or greens repair tools.

A tenth embodiment is a card member approximately twice as long as the preferred embodiment having means (such as a crease, hinge, stitching, etc.) to allow the card member to fold and unfold. Centered on said member and bisected by the fold is a diamond-shaped opening having various possible included angles but preferably including angles of 12 degrees, 168 degrees, 12 degrees and 168 degrees. When folded, this embodiment appears as a card member with a v-shaped face having a 12 degree vertex angle. Imprinted on each of eight edges of the opening are distinct sets of lines and numerals such that different eye-to-device distances and differently-sized objects can be accommodated.

Additional and Alternative Embodiments—Other Shaped Openings

An eleventh embodiment is a card member in accordance with the preferred embodiment but having a curvilinear-shaped opening that conforms to design or aesthetic requirements, not to plotted image widths that correlates image sizes to evenly spaced calibration lines.

A twelfth embodiment is a card member in accordance with the preferred embodiment but having a rectangular-shaped opening. One edge of the opening includes a slit housing a slidable door that, when fully retracted into the slit, forms one outermost edge of the opening and, when fully extended, closes the opening. Each edge adjacent to the slidable door includes a distinct set of lines and numerals. The reverse side of the member may include additional distinct sets of lines and numerals. In operation, the user aligns the object image in the opening and slides the door until the measured linear dimension of the image touches, without being obscured by, the opening formed by the door and the opposite edge of the opening. Distance is determined by reference to the line and numeral corresponding to the position of the slidable door. It is contemplated, but not shown, that this embodiment could include two slits and two slidable doors; no slits but having a door or doors that slide along the face of the opening; lines and numerals expressed on the slidable door rather than on the member; or lines and numerals expressed on a transparent portion in the opening itself.

A thirteenth embodiment is a card member including a circular opening made from a transparent material with distance information expressed through the center. Slidable doors in accordance with the twelfth embodiment but semi-circular in shape are housed in and extend from slits in the card member. In operation, the closing of the doors appear to narrow the width of the opening to just fit the image size, which is correlated to the distance information.

Figure 9:
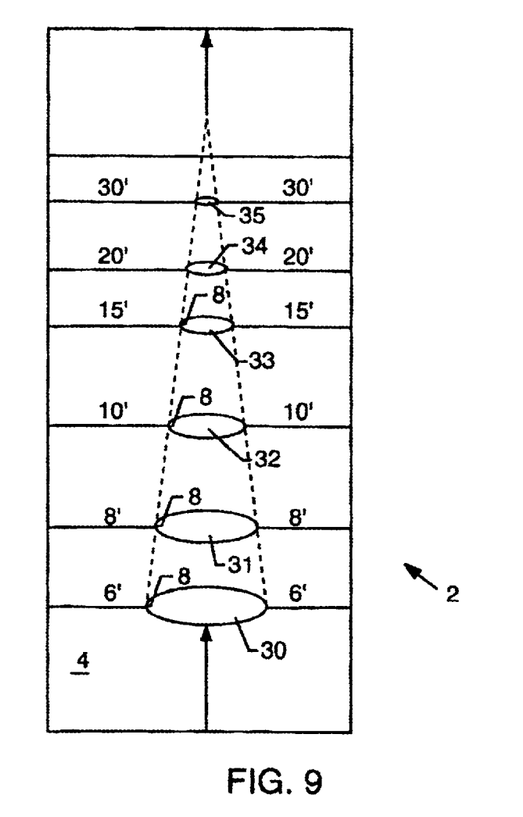
FIG. 9 is a front elevation of a further alternative form of the range finder of FIG. 1.

Additional & Alternative Embodiments—Multiple Windows (FIG. 9): A fourteenth embodiment of the invention is shown in FIG. 9 wherein a series of openings 30, 31, 32, 33, 34. And 35, through which to view the linear dimension of an object image, are disposed one above the other and are of decreasing size. In this embodiment of the invention, the outer edges of the openings 30–35 form the sides of a triangle as shown in dotted lines. Calibration lines 36–41 with indicia inscribed thereon indicate the distance to the desired object, in this case a putting cup. In this embodiment, the user moves the range finder up or down until the known or estimated linear dimension of the desired object is viewed through one of the openings, just filling said opening or touching the sides of said opening. The user then reads the distance as indicated by the adjacent calibration. Although each opening is sized to accommodate a particular image of a particularly sized object at a particular distance, the arrangement and spacing of the openings are variable. Although this embodiment can take an innumerable number of forms, additional embodiments 15 through 18 are exemplary.

A fifteenth embodiment is a card member in accordance with the preferred embodiment but having a series of differently-sized openings arranged in two columns.

Figure 10:
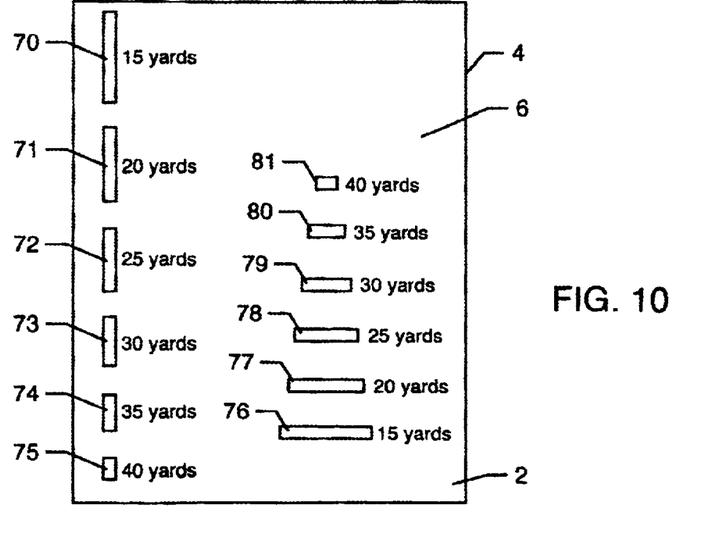
FIG. 10 is a front elevation of a further alternative form of the range finder of FIG. 1.

(FIG. 10): A sixteenth embodiment, shown in FIG. 10, is a card member 4 in accordance with the preferred embodiment with a series of vertically arranged rectangles 70 through 81 of decreasing size designed to accommodate a desired object such as a golf flag when hanging limp in no-wind conditions. FIG. 10 illustrates two arrangements of openings, vertical 70–75 and horizontal 76–81, which could be used separately or together. Rectangles of different dimensions could be similarly created and applied to determine the distance to other objects such as a greens flag fully extended in windy conditions. The size of the openings would be determined by the known or estimated linear dimension of the desired object and by the application of the $z=xy/d$ formula, as adjusted if necessary in accordance with the formula $a^2=b^2+C^2$ as otherwise discussed above. In this embodiment, the user moves the range finder up or down or to the left or right until the known or estimated linear dimension of the desired object is viewed through one of the openings, just filling said opening or touching the sides of said opening. The user then reads the distances as indicated by the adjacent distance information. The various openings or windows of increasing or decreasing size could be implemented in a card member or other device arranged in a vertical, horizontal or some other way which would not necessarily have to be roughly triangular or otherwise aligned regularly in shape.

A seventeenth embodiment is a card member having a transparent viewing portion and circular lines arranged in concentric circles expressed thereon, each circle being sized to accommodate a particular image of a particularly sized object at a particular distance.

Additional & Alternative Embodiments—Optical Devices

An eighteenth embodiment is a monocular device held to the user's eye which incorporates the instant invention. Such a device is generally composed of a front and rear wall joined together by an opaque perimeter housing, said rear wall containing a viewing aperture, the front wall containing a light receiving opening, and the middle portion comprising a see-through passage connecting said rear aperture and front opening, said passage including a reticle having a window portion and expressions of distance information so that, when an object is viewed through the range finder, its image can be aligned in said opening in accordance with the invention and the distance to said object determined by reference to the expression of distance information on the reticle. It is contemplated that the monocular devices may also contain one or more magnifying, focusing, image reducing or other vision enhancing or distance determination elements.

A nineteenth embodiment is a simple viewer held to the user's eye with the invention incorporated into the viewing mechanism.

A twentieth embodiment is a simple prism binocular incorporating the invention. The embodiment generally includes two telescopes connected by a structure having a standard main focus. Each telescope includes a standard objective lens, Porro prisms, field lenses, eye-piece and independent focus, and in addition, reticles including an opening and distance information in accordance with the invention. In operation, when focused, the reticles appear as one reticle. It is contemplated that the binocular device may also contain one or more additional magnifying, focusing, image reducing or other vision enhancing or distance determination elements.

A twenty-first embodiment is a simple rifle scope incorporating the invention. The scope generally includes a standard main scope tube, objective lens, erector lenses, reticle, field lens, eye-piece and a dovetail for mounting on a rifle. Expressed on the reticle are lines forming cross-hairs and additional lines and numerals forming an opening and recorded distance information in accordance with the invention. It is also contemplated that the scope may also contain one or more additional magnifying, focusing, image reducing or other vision enhancing or distance determination elements.

Additional & Alternative Embodiments—Multiple Members

A twenty-second embodiment is a system of card members in accordance with the preferred embodiment linked through a crease, ring binder, stitching, heat sealing or other means, each card member having a similarly shaped opening but distinct sets of lines and numerals so that many differently-sized objects, or many different eye-to-device distances, can be accommodated. In operation, the user would locate and select the card member corresponding to the relevant object or specified dimension and then align the object and estimate distance in accordance with the invention. Because the openings on the card members are identical, the user can view the object(s) through multiple openings thereby allowing for multiple applications of the device to determine distance to various desired objects.

A twenty-third embodiment is a viewer in accordance with the nineteenth embodiment but having interchangeable reticles. This can be accomplished by forming a sleeve in a wall of the viewer to accommodate individual slides having reticles having differently marked or shaped openings. Alternatively, multiple reticles may be formed on a flat circular panel that rotates on a shaft when engaged by a lever, thus interposing the desired reticle between the object and the eye within the viewer.

Additional & Alternative Embodiments—One Window, Adjustable

The embodiments discussed thus far are more adjustable than the prior art because, among other things, they create a more useable invention which can more easily determine distances from one or more than one size of object, and in many cases, accommodate different eye-to-device distances. The following embodiments allow the user to determine virtually any distance from visible objects of many (theoretically all) sizes so long as one linear dimension of the desired object is visible and is known or can be estimated.

A twenty-fourth embodiment includes a card member in accordance with the preferred embodiment that is linked to, and forms the cover of, a tablet or booklet. The card member includes an isosceles triangle-shaped transparent opening with approximate included angles of 84 degrees, 84 degrees and 12 degrees, it being understood that the size and shape of the opening may vary substantially in accordance with the invention. Two sets of lines, comprising a system of measurement, run along each equally sized leg of the triangle. In this embodiment the reference lines are expressed in inches, it being understood that any system of linear measurement can be used. The card member is attached to the booklet through a ring binder, it being understood that other means may be used (e.g., hinges, stitching, heat sealing). The tablet or booklet has a plurality of pages, which may be made of paper, plastic, laminate material or the like. Recorded on the pages are tables of information correlating object dimensions, image positions on the opening, and distances. This information can be generated through experimentation or through the formula $d=xy/z$ (with such adjustments as may be appropriate as discussed above) for each relevant object dimension and then recording the position on the opening where the object image appropriately touches without being obscured by two sides of the opening. In operation, the user determines or estimates one linear dimension of the object, holds the device at a specified distance from the eye, aligns the object in the opening as discussed above, notes the position on the system of measurement where the object image just touches two sides of the opening, and determines range by locating the row and column on the pages showing the appropriate distance.

A twenty-fifth embodiment includes everything in the previously discussed embodiment, but the opening is made of transparent material and a single line incorporating a system of measurement runs from the vertex of the triangle to the mid-point of the base of the triangle. The line appears as a thin, unobtrusive line that can be seen at the selected eye-to-device distance but that does not substantially interfere with the user's ability to view the desired object through the opening because, unlike a reference line device, the line is transverse to the relevant object dimension. The device is used in the same manner as discussed above so as to determine the position of the object image on the system of measurement.

Additional & Alternative Embodiments—One Window, Adjustable, Electronic (FIGS. 11, 12, and 13): A twenty-sixth embodiment (FIGS. 11 through 13) is an electronic "calculator" range finder. Like the twenty-fifth embodiment, it implements the invention through a triangular-shaped window and a system of measurement capable of measuring the position of the object image on the window. However, the device is made so that the user can convert image position to distance through inputting information in the calculator, which is programmed to convert image position to image size and then image size to distance in accordance with the formula $d=xy/z$. The additional formula $a^2=b^2+c^2$ could be included for use to adjust such formula where appropriate.

Figure 11:
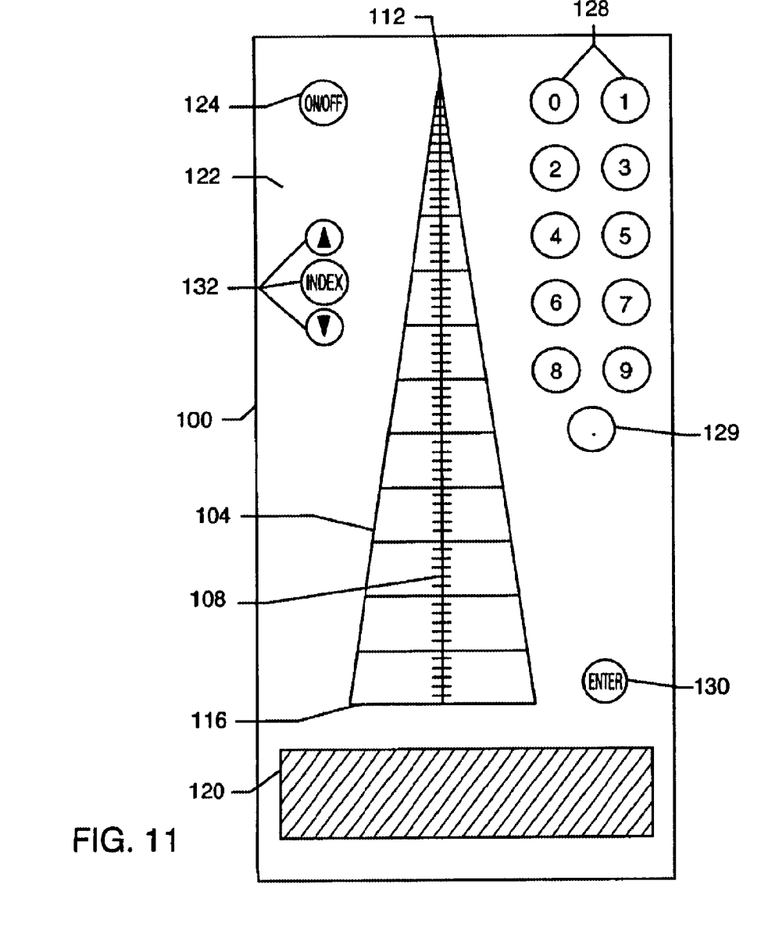
FIG. 11 is a front elevation of a further alternative form as applied to an electronic device of the range finder of FIG. 1.

As shown in FIG. 11, this embodiment includes a case 100 having the approximate relative dimensions of a hand-held calculator, it being understood that the device could be larger or smaller and that the invention encompasses any structure that could accommodate any sort of electronic calculator (e.g, as incorporated in the housing of a viewer or scope). The case 100 includes a triangular-shaped window 104 made of transparent material and a system of linear measurement 108 expressed from the vertex 112 to the center of the base 116 of window 104, it being understood that a window could take a variety of shapes in accordance with the invention and that the window could be open space with the system of measurement expressed adjacent to an edge of the window. The case 100 also includes an electronic calculator (not shown in FIG. 11), a display panel 120, a keypad 122 with an on/off key 124, a plurality of numerical data entry keys 128 representing the numerals 0 through 9, a key 129 to input a decimal point, an "enter" key 130 and a plurality of keys 132 to access an optional index program. It is understood that case 100 could incorporate additional keys, such as keys to select systems or units of measurement. It is further understood that the device could be enclosed by a case cover.

Figure 12:
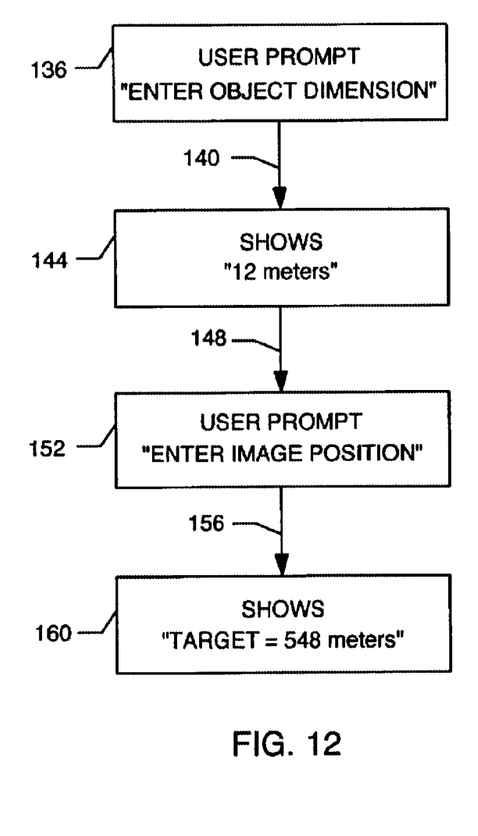
FIG. 12 is a block diagram of the process messages for the further alternative form as applied to an electronic device of the range finder of FIG. 11.

FIG. 12 shows a generalized block diagram in sequential order showing some of the various messages appearing on the display panel 120. In block 136, the user prompt "Enter Object Dimension" is shown. This initiates the process. The user then keys in, or accesses through an index program contained in the device, the known or estimated length, width, height or other linear dimension. The display then proceeds via sequential path 140 to block 144, which shows an example of the user-entered data. Sequence path 148 then proceeds to block 152, which shows that the display panel 120 displays a second user prompt "enter image position." The user views the object through window 104 and notes, using system of measurement 108, the exact position on window 104 at which the object's image appears to touch, without being obscured by, the two long sides of window 104. The user then keys in and enters the position of the image. Sequential data path 156 then leads to block 160, which shows the distance to the object.

Figure 13:
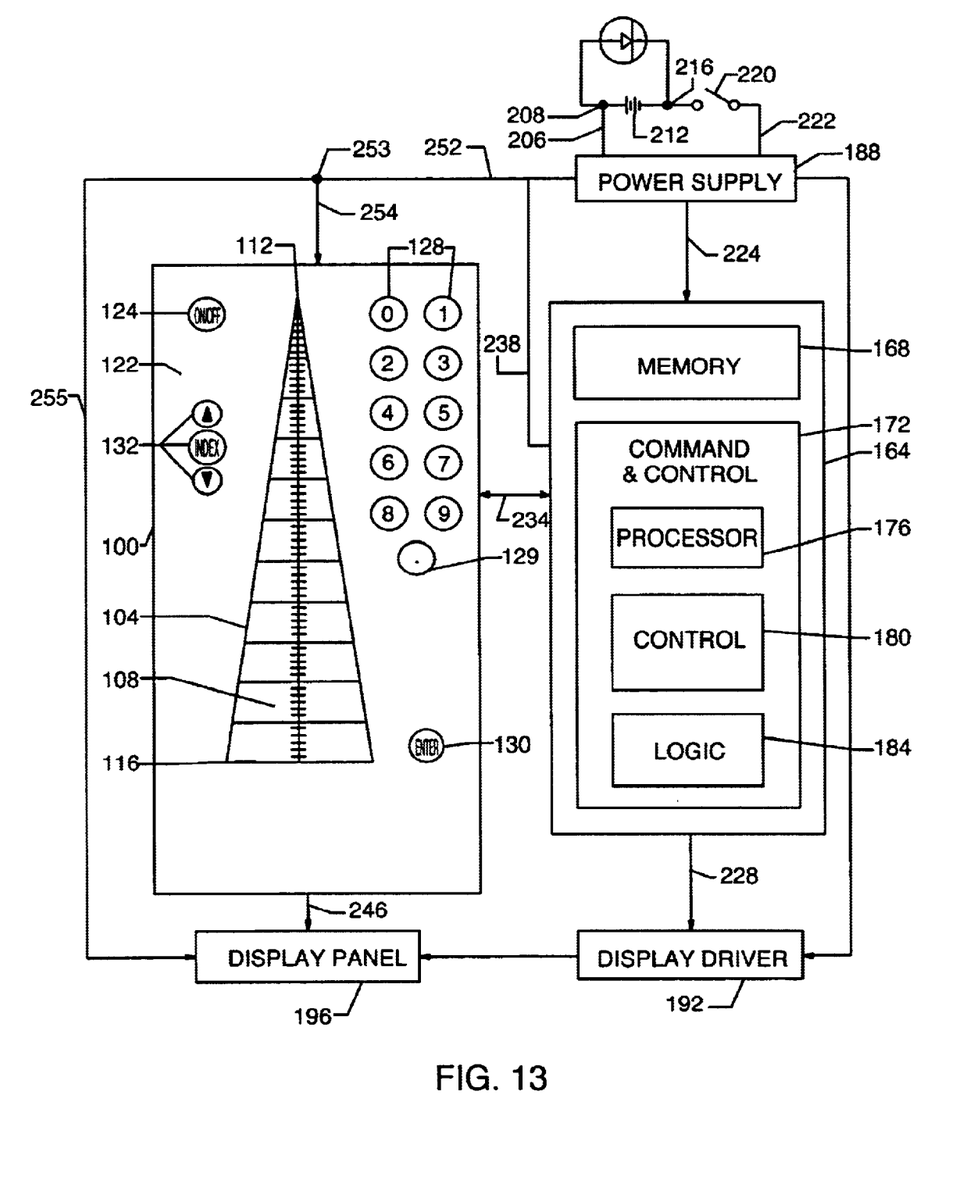
FIG. 13 is a functional block diagram of an electronic calculator device for the further alternative form of the range finder of FIG. 11.

We have no special expertise in the manufacture of calculators, but it is our understanding that a person skilled in the art could create an electronic calculator range finder from the description above. For further clarification, FIG. 13 represents a functional block diagram of the calculator system 164 housed within case 100. The calculator system 164 includes a memory 168 and a command and control system 172 comprising a processor 176, control 180 and logic 184. The calculator system 164 also includes a power supply 188 and a display driver 192. The power supply 188 includes a lead 206 passing from the power supply 188 to a node 208. Node 208 is connected to the positive terminal of a battery 212 whose negative terminal is connected directly to an output node 216. Node 216 is connected directly to a normally open switch contact or terminal while a movable switch arm 220 is connected by a lead 222 back to power supply 188. The switch arm 220 is operated by the on/off key 124; and when the switch arm 220 is closed on the contact attached to node 216, the system is energized. Furthermore, another output of the power supply 188 is connected via lead 224 directly to an input to the internal or interior calculator system while a second output lead 252 connects power supply 188 to node 253. Node 253 is connected directly to the power supply input of case 100 via lead 254. Node 253 is also connected via lead 255 to the power supply input of display panel 196. Data from keypad 122 is supplied via data path 246 to one input of the display panel 196 while a two-way data path 234 connects keypad 122 to the internal calculator system 164. Lead 228 provides an output from the internal calculator system 164; and it is connected to the input of the display driver 192 for controlling the operation of the display panel 196, as known in the art. It is understood that additional features, such as a light emitting diode (LED) can be incorporated into the device.

The memory 168 of the internal calculator system 164 is provided with one or more programmable memories, for example ROMs and/or PROMs, which are pre-programmed at the factory. These programs would include, among others, a program to convert image position on window 104 into image size and a program to convert an image size into distance through the d=xy/z formula. The programs would also include the user prompts discussed above. In operation, the user actuates the on/off key 124, which closes the switch arm 220. A stored program then calls for the first user prompt to be displayed on panel 196. The user then actuates the appropriate numerical data entry keys 128 of the keypad 122, and, through user input or selective access of the various stored programs of object linear dimension, distance to a target object is determined.

The twenty-sixth embodiment would allow the user to quickly and easily determine the distance to a wide variety of differently sized objects (which is not possible with prior window-based or stadia-line devices), but would not significantly impede the user's view of the object or require the user to measure image size (as is the case with reference-line devices). These embodiments thus adopt the ease of use of window-based range finders with the flexibility in application of reference line devices.

A twenty-seventh embodiment includes all of the elements of the twenty-sixth adjustable embodiment and, in addition, a second program consisting of an alphabetized index of common items and their dimensions. For example:

Abrams Tank (model M1A):
  length=34 ft.
  width=12 ft.
  height=9.5 ft.

In this embodiment, the device would incorporate an "index" key and two arrow keys allowing the user to "scroll" or otherwise search through the index as displayed on the display window. The user would have the option of entering a known or estimated linear measurement or entering an item selected from the index, after which he or she would follow steps described above.

A twenty-eighth embodiment is a viewer or telescope in accordance with the nineteenth, twentieth, twenty-first or twenty-second embodiments that further includes the line(s) incorporating a system of measurement and calculator functions disclosed in the twenty-sixth and twenty-seventh embodiments.

It is expressly contemplated that the invention could be easily incorporated into or appended to other equipment, (e.g., a rifle, camera, telescope, signal reflection range finder, a direction-finding device, or devices using other location determining information including global positioning system technology).

Advantages

The advantages of the invention can easily be seen and include the following. First, it is obviously simpler, lighter, more portable, more energy efficient, more adaptable and cheaper than signal reflection range finders. Second, the invention greatly improves the capabilities of the existing image based range finders and greatly expands their potential uses. The absence of a predetermined or fixed shape to the opening(s) and the absence of the need for uniformly spaced lines provide maximum flexibility for the manufacturer and user. Such a device, in all of its embodiments, can (a) accommodate almost any design need; (b) determine both short and long distances without requiring an odd shape, an inordinately large device, or inordinately small spaces between calibration lines; (c) determine relatively short distances to relatively small objects; (d) more precisely determine distances between objects on the ground; (e) be made adjustable by (i) applying differently-spaced calibration lines, (ii) applying differently shaped windows, some with moveable sides to adjust for different human factors, (iv) applying magnification, focusing, image reducing, or other vision enhancing or distance determination elements, (v) linking identically shaped card members or slides in a system capable of measuring distances from multiple objects of many different sizes, and (iv) incorporating the invention in a simple, two- or three-step electronic range finder, Although the description above contains many specifications, these should not be construed as limiting the scope of the invention but as merely providing illustrations of some of the presently preferred embodiments of this invention. For example, the structure supporting the range finding opening can be made of various materials and take many shapes. The openings, moreover, can take any number of shapes and sizes. The openings can be voids or can consist of transparent portions. Thus, the scope of the invention should be determined by the appended claims and their legal equivalents, rather than by the examples given.

Obviously, numerous other variations and modifications could be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A range finder for determining distance to a desired object, said range finder comprising:

a first member containing a transparent viewing portion therein including means changing linearly in width and positionable to accommodate a dimension of said object transverse to a line from said object to said range finder when viewed through said viewing portion;

means indicating the distance to said object when the object appears to just fill said viewing portion;

wherein said distance indicating means are determined in accordance with the formula $z=xy/d$, where z is the width of said viewing portion, x is the approximately determined linear dimension of said object, y is the defined distance from the user's eye to said device, and d is the actual distance from said object to said user's eye; and wherein the determination of said actual distance is adjusted in accordance with the formula $a^2=b^2+c^2$, where a is the distance from said object to the user's eye, b is the distance from the user's eye to a second object located on approximately the same level as said object, and c is the distance from said object to said second object.

2. A range finder for estimating a plurality of distances from an object having an approximately determinable linear dimension of less than 1.5 feet, said range finder comprising:

a portion through which to view said linear dimension's image;

means to correlate the size of said linear dimension's image to the actual distance from said object to the user;

wherein said means is determined in accordance with the formula $z=xy/d$, where z is the width of said viewing portion, x is the approximately determinable linear dimension of said object, y is the distance from the user's eye to said range finder, and d is the actual distance from said object to the user's eye; and wherein said determination of said actual distance is adjusted in accordance with the formula $a^2=b^2+c^2$, where a is the distance from said object to the user's eye, b is the distance from the user's eye to a second object adjacent to the user on approximately the same level as said object, and c is the distance from said object to said second object.

3. The method of determining distance between two objects on a common level where object A is the distant object, object B is the nearer object, where object B is located at the user, and at least one linear dimension of object A can be approximately determined, said method comprising the steps of:

providing a device having a transparent viewing portion through which to view said object A and positionable to accommodate a linear dimension of said object A transverse to a line from said object A to said device when viewed through said viewing portion;

positioning said device at a defined distance from the user's eye;

viewing and positioning the image of said object A through said viewing portion;

referring to means indicating the actual distance to said object A when said object A just fills said viewing portion, said actual distance being determined in accordance with the formula $z=xy/d$, where z is the width of said viewing portion, x is the approximately determined linear dimension of object A, y is the defined distance from the user's eye to said device, and d is the distance from object A to the user's eye; and adjusting said distance measurement in accordance with the formula $a^2=b^2+c^2$, where a is the distance from object A to the user's eye, b is the distance from the user's eye to object B, and c is the distance from object A to object B.

4. The method of claim 3 wherein:

said approximately determined linear dimension of object A is less than 1.5 feet.

5. The method of claim 3 wherein:

said distance from said object A to said object B is less than 60 feet.

6. The method of claim 3 wherein:

said object A is the golf hole on a golf green and object B is a golf ball positioned adjacent the user's feet.

7. The method of claim 3 wherein:

said object A is a baseball base on a baseball diamond and object B is another base on the same baseball diamond.

8. A range finder for estimating a plurality of distances from an object having an approximately determinable linear dimension of less than 1.5 feet, said range finder comprising:

a portion through which to view said linear dimension's image;

means to correlate the size of said linear dimension's image to the actual distance from said object to the user;

wherein said means is determined in accordance with the formula $z=xy/d$, where z is the width of said portion, x is the approximately determinable linear dimension of said object, y is the distance from the user's eye to said range finder, and d is the actual distance from said object to the user's eye; and wherein said determination of said actual distance is adjusted in accordance with the formula $a^2=b^2+c^2$, where a is the distance from said object to the user's eye, b is the distance from the user's eye to a second object adjacent to the user on approximately the same level as said object, and c is the distance from said object to said second object.

9. The range finder of claim 8 wherein:

said plurality of distances including distances of less than 60 feet.

10. The range finder of claim 8 wherein:

said object is a golf hole on a golf green.

* * * * *